COLOR CORRECTION SYSTEM FOR VIDEO TAPE RECORDERS

Filed Oct. 22, 1965 3 Sheets-Sheet 1

INVENTOR.
PETER SWIFT CARNT
BY
Edward J Norton
Attorney

INVENTOR.
PETER SWIFT CARNT
BY
Edward J. Norton
Attorney

Aug. 12, 1969 P. S. CARNT 3,461,226

COLOR CORRECTION SYSTEM FOR VIDEO TAPE RECORDERS

Filed Oct. 22, 1965 3 Sheets-Sheet 3

INVENTOR.
PETER SWIFT CARNT
BY
Edward J Norton
Attorney

1

3,461,226

COLOR CORRECTION SYSTEMS FOR VIDEO TAPE RECORDERS

Peter Swift Carnt, Herrliberg, Switzerland, assignor to RCA Corporation, a corporation of Delaware Filed Oct. 22, 1965, Ser. No. 501,212
Int. Cl. H04n 5/38, 1/46, 9/00
U.S. Cl. 178—5.4 10 Claims

ABSTRACT OF THE DISCLOSURE

There is disclosed a system for correcting phase errors in television signals, which are particularly troublesome in color television tape recording. A reference carrier with particular phase characteristics is added to the color signal before recording. On playback, an error signal is generated in view of the particular phase characteristics of the reference carrier for providing compensation of the line to line phase deviations of the video information.

This invention relates to video recording and particularly to a novel system for color control in video recording systems.

One of the most serious problems in video tape recording is the preservation of color or chrominance information. The chrominance portion of a video signal comprises two suppressed carrier signals, each containing one of the two parts of the chrominance information. The carrier waves of both chrominance signals are of the same frequency but are in phase quadrature with each other. In order to accurately recover the chrominance information in a color receiver, the carrier must be reinserted in proper phase relationship to the chrominance signal. Very precise phase control must be maintained between the chrominance signal and the carrier for proper decoding. For this reason a short burst at the carrier frequency is transmitted with the rest of the video and is used as a reference in decoding. Any phase distortion suffered by the chrominance signal during transmission is generally suffered also by the burst. But in video tape recording, many of the elements of the recording and reproducing device introduce phase distortions in the chrominance signal which are not suffered to a similar extent by the burst. Such phase distortions, if not controlled or corrected, may seriously degrade the chrominance information of a reproduced video signal.

It is therefore an object of the present invention to provide an improved system for accurately recording and reproducing color video signals.

It is a further object of the present invention to provide a means for developing a reference carrier which experiences all the phase distortions which the chrominance signal experiences in the recording or reproducing processes.

Briefly the present invention employs a special type of reference carrier which has been suggested for use in video transmission systems in, "Eigenschaften der NTSC-Farbfernsehiibertragung mit additivem Referenztrager," Radio Mentor, December 1964, p. 986, by Vortrag von N. Mayer et al. See also, "ART: A New Colour System," Wireless World, June 1964, p. 307. The reference carrier exists during the entire active line of the video and, therefore, experiences any phase distortions experienced by the chrominance signal during any part of the active line. Thus, the reference signal may be used to correct any phase errors or as a reference in the demodulation process. The characteristics of the reference carrier are that it be of the same frequency as the chrominance sub-carrier. (The two chrominance sub-carrier signals are generally referred to as the I and Q components; the I component phase lags the color burst by 57° and the Q component phase lags the I component by 90°.) The phase of the reference carrier, hereinafter referred to as the ART (Additional Reference Transmission) carrier, is switched by 180° with reference to the chrominance signals from video line to video line so that the ART carrier is for one video line in phase with the I component carrier and for the next line 180° out of phase with the I component carrier. This characteristic of the ART carrier facilitates the individual recovery when desired of either the ART carrier or the chrominance signals. The chrominance signals, normally being 180° out of phase from video line to video line (hence dot interlace) can be recovered to the exclusion of the ART carrier by subtracting successive lines of video. The ART carrier can be recovered to the exclusion of the chrominance signals by adding successive lines of video since the ART carrier in effect remains in phase from video line to video line. Recovery of these two components occurs properly only if there are no severe phase changes in the video from line to line and no appreciable change in the chrominance signal from line to line.

2

In the discussion of the ART carrier given in the two above mentioned articles, it is assumed that successive lines of video are very similar and no severe phase changes take place from line to line. However, in the recording art it is possible for one line to suffer a severe phase change with respect to the preceeding line. Such phase changes require that additional measures be taken in the recovery of the ART carrier and the chrominance signal components. According to the present invention, the situation is corrected by detecting any such phase changes and phase shifting one of the lines, to be added or subtracted from an adjacent line, by the required amount. A number of techniques may be employed to induce the proper phase shift. Three embodiments of the invention for accomplishing the phase shift are described below. Broadly speaking, the amount of phase shift is determined either by comparing the phases of successive lines of video to determine the phase difference or by comparing the phases of successive color burst signals. In the former case means are provided for removing a spurious component caused by the ART carrier's 180° phase variation from line to line.

A more detailed description of the present invention will be given with reference to the accompanying drawings in which.

Figures 1, 2:
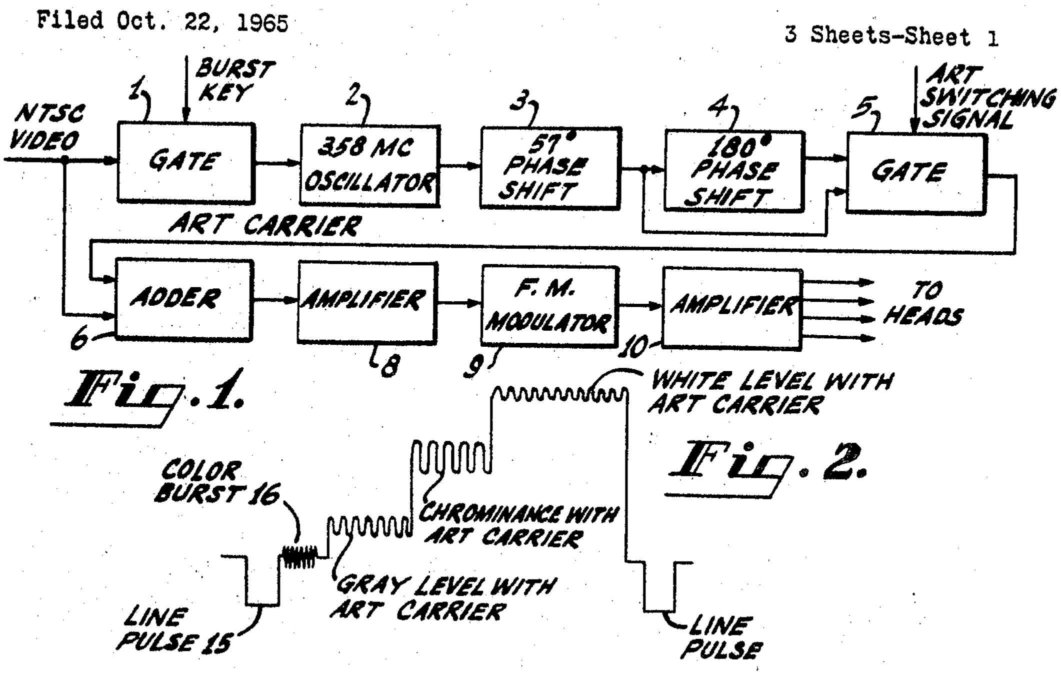
FIGURE 1 is a block diagram of a recording system constructed according to the present invention.
FIGURE 2 is a waveform diagram showing certain aspects of the present invention.

Before describing the present invention in detail a brief review of color television principles used in the subsequent description will be given. One line of a conventional NTSC color video signal contains three components. The first is a monochrome or luminance component, Y, which is composed from a particular mixture of the red, green and blue information from the color camera. The other two are chrominance signals, I and Q, transmitted simultaneously with the luminance component by a two-phase, suppressed carrier modulation process. The same carrier frequency is used for both the I and Q components, but the carrier of the latter phase lags that of the former by 90°. The carrier frequency is an odd multiple of one half the line frequency and therefore its phase varies by 180° from line to line. The 180° phase change from line to line causes the dot interlace pattern on the picture tube which contributes to high picture quality. In order to demodulate the composite NTSC signal, the carrier frequency of the two chrominance signals must be developed in the receiver in proper phase relationship to the I and Q components. In order to establish the proper phase relationship, a short burst, called the "color burst," of the chrominance carrier is transmitted along with the rest of the video in the proper phase relationship. The burst appears on the "back porch" of the line sync pulse, during which no other information is being transmitted. In the receiver, a local oscillator at the color carrier frequency is phase controlled by the color burst and the oscillator signal is then used to demodulate and I and Q portions of the signal. Generally, if the video signal suffers some phase distortion during transmission, both the color burst and the chrominance signals suffer the same distortion so no difficulty is encountered in demodulation. Recording of video signals, however, presents more serious phase distortion problems than transmission and it is very possible that the chrominance components will suffer phase distortions not suffered by the burst. Common sources of phase errors in video recording are differences in tape or head speed between the recording and reproducing process, and difference in the head-to-tape geometry, e.g. tape stretch, between the two processes.

Consider, for example, a difference in the degree of tape stretch between recording and reproducing. If the tape is stretched by a greater amount during reproduction than during recording, the signal read from the tape will appear at a frequency lower than the correct frequency. If the frequency error is constant, then it may be expressed as a linearly varying phase error. Thus, the phase error experienced by the color burst, which appears for only a very short time, will be quite different from that experienced by the chrominance signals. Using the color burst as a phase reference therefore does not correct the error.

The recording system of the present invention provides a reference carrier which exists during the entire active line of the video, i.e. during the entire interval in which the chrominance signals appear. The characteristics of the reference carrier are essentially the same as those of the ART transmission system discussed in the above mentioned articles.

FIGURE 1 is a block diagram of a system for converting a conventional NTSC video signal to a corresponding ART video signal and for recording the latter on a conventional tape recorder. While the present description will be given with reference to quadruplex machines it is to be noted that in general any type of video recorder may be used in connection with the present invention. The NTSC video signal to be recorded is supplied to a gate 1, of conventional design, which is open by the burst key signal, so that the output of the gate 1 is the color burst of the NTSC video signal. The color burst from the gate 1 controls a 3.58 mc. (megacycle) oscillator such that the phase of the oscillator signal is the same as that of the color burst. The output of the oscillator 2 is supplied through a 57° phase shift network 3 to both a 180° phase shift network 4 and to a second gate 5. The output of the 180° phase shift network 4 is also supplied to the gate 5. The gate 5 is controlled by an ART switching signal which may be developed from the line sync pulses to perform the function described below. The output of the gate 5 is supplied to a conventional adding network 6, as is the NTSC video signal. The adder 6 may be, for example, a conventional resistive adding network. The output of the adder 6 is amplified by the amplifier 8, modulated by a conventional FM modulator 9, again amplified in an amplifier 10, and then supplied to the four heads of the quadruplex recording machine.

In the operation of the recording system shown in FIG. 1 the elements numbered 1 through 5 act to form the ART carrier signal which is added to the NTSC video signal in the adder 6. Since the phase of the ART carrier must be in a proper relationship with respect to the NTSC signal, it is developed from the color burst signal appearing on each line of NTSC video. Thus, the color burst is separated from the NTSC video by the gate 1 which is opened only during the period of the color burst. The burst key signal which operates the gate 1 is generally available in color television recording equipment. The color burst from the output of the gate 1 controls the phase of the oscillator 2 such that a continuous 3.58 mc. signal is developed whose phase is equal to that of the color burst. Since the phase of the ART carrier is either in phase with the I component or 180° out of phase with this component, the output of the oscillator 2 is shifted by 57° in the network 3 to provide a signal in phase with the I component. (FCC standards require that the I component phase lag the color burst by 57°.) The 180° phase shifting network 4 supplies the signal which is out of phase with the I component. To form the ART carrier the gate 5 alternately selects, from line to line, the in phase and out of phase components supplied respectively from the phase network 3 and the phase shift network 4. Thus the ART switching signal supplied to the gate 5 is such that the gate 5 passes the in phase component during one active line and the out of phase component during the next active line. During the periods between active lines, i.e. the line sync period and the color burst period no ART carrier is present. Thus, the gate 5 is only open to either of the two input signals during the active line of the video information. The output of the gate 5, which is the ART carrier, is then added to the NTSC video signal in the adder 6. The output of the adder 6 is supplied through a conventional FM modulator network comprising the amplifier 8, the modulator 9, and the amplifier 10 to the four heads of the quadruplex machine.

FIGURE 2 shows a waveform of the ART video signal which might for example appear at the output of the adder 6. It should be noted that no ART carrier is present during the line sync pulse 15 nor during the color burst period 16. In the waveform of FIGURE 2 the first portion of video is a gray level with no chrominance signal, and thus, only the ART carrier appears during this period. The middle portion of the video signal illustrated in FIGURE 2 shows some level of chrominance with the ART carrier. The third portion of the illustrated waveform corresponds to a white level of the video signal and again no chrominance is present, but rather only the ART carrier appears.

Figure 3:
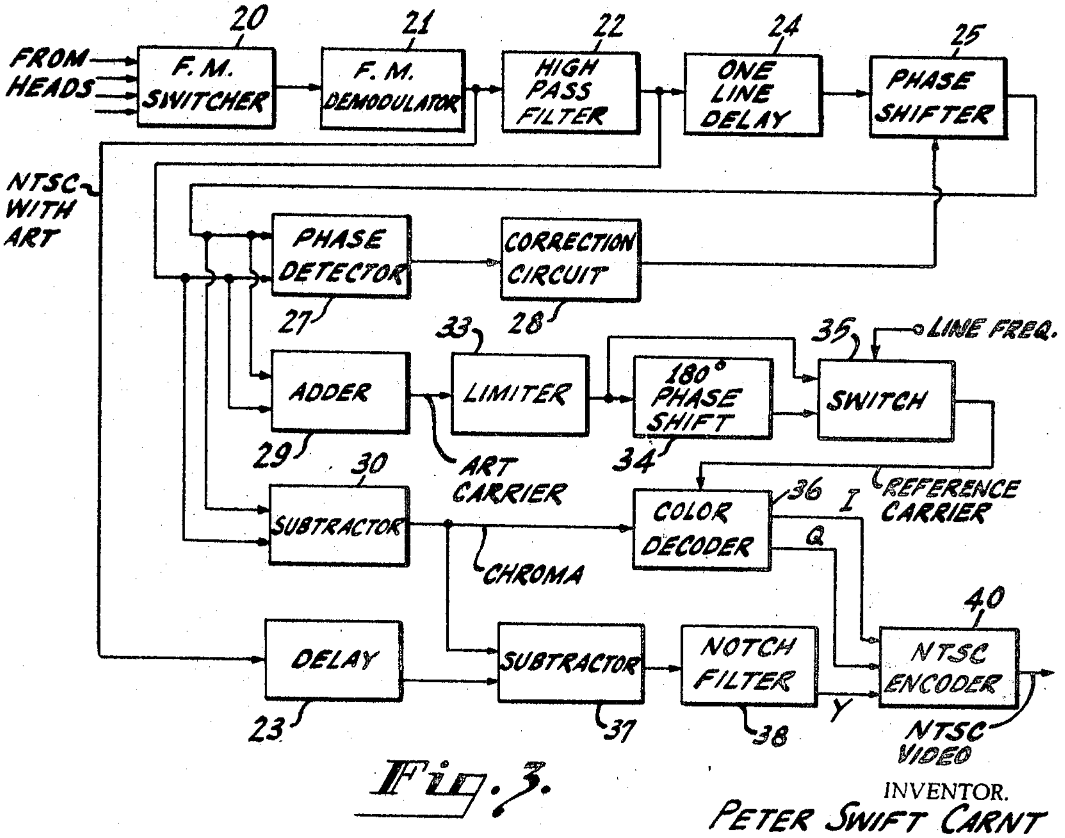
FIGURE 3 is a block diagram of a reproducing system constructed according to the present invention.

FIGURE 3 is a block diagram of one embodiment of a reproducing device constructed according to the present invention. The four signals read from the four quadruplex heads on the video machine are supplied to a conventional FM switcher 20 which converts the four simultaneous signals appearing at its input to one continuous video signal. The output of the FM switcher 20 is supplied both to a conventional FM demodulator 21, the output of which is connected to a high pass filter 22 which passes all of the video signal containing chrominance information, i.e. frequencies above about 2 mc., and to a delay network 23. The output of the high pass filter 22 is supplied to a one line delay network 24, the output of which is supplied to a phase shifting network 25. The outputs of both the high pass filter 22 and the phase shifter 25 are supplied to a phase detector 27, an adder 29, and a subtractor 30. The phase shifter 25 is of conventional design and may be, for example, a tuned circuit including an inductor and a voltage variable capacitance diode. The phase detector 27 is constructed to detect phase errors in successive lines of video. Thus, the phase detector does not develop an output signal in response to the normal 180° phase difference in the chrominance signals but rather it develops an output signal only when a phase relationship other than the normal 180° out of phase relationship is detected. The output of the phase detector 27 is supplied, through a correction circuit 28, the construction of which will be described in more detail below, to the phase shifting network 25. The degree of phase shift induced by the network 25 is controlled by the voltage appearing at the output of the correction circuit 28. The adder 29 is of conventional construction and may be a simple resistive adding network. The subtractor 30 is also of conventional design and may comprise a resistive adding network and an inverter connected to either one of the inputs. The output of the adder 29 is supplied, through a limiter 33 which provides a constant amplitude signal, to both a 180° phase shift network 34 and a switch 35. The switch 35 alternately switches, line by line, between the direct signal from the limiter 33 and the 180° signal from the network 34. Thus, the output of the switch 35 is a reference signal of constant phase, assuming no phase distortions, which is supplied to a conventional NTSC color decoder 36. The output of the subtractor 30 is also supplied to the color decoder 36. The output of the subtractor 30 is subtracted from the delayed ART video signal in the subtractor 37. The output of the subtractor 37 is supplied, through a notch filter 38 which removes the remaining ART carrier, to a conventional NTSC encoder 40.

In the process of reproducing the ART video signal read from the quadruplex heads the operations of the FM switcher 20 and the FM demodulator 21 are conventional. Thus, the signal appearing at the output of the demodulator 21 is a video signal containing both the conventional NTSC signal and the ART carrier.

The ART video signal at the output of the demodulator 21 is passed through a high pass filter 22 which passes the HF (high frequency) component of the video including the I and Q chrominance signals, the ART carrier, and the color burst, i.e. the components above about 2 mc. Each line of the HF component is added to the next successive line in the adder 29 and subtracted from the next successive line of the HF component in the subtractor 30. Since there is a 180° phase change in the I and Q components from line to line, those components cancel in the adder 29 while the ART carrier components of the two successive lines add, since they are in phase with each other. Thus, the ART carrier appears at the output of the adder 29. In the subtractor 30, the ART carrier components cancel while the chrominance components add and thus the pure chrominance signal appears at the output of the subtractor 30. These processes in the adder 29 and the subtractor 30 cannot properly occur if there are any significant phase distortions in the video signals supplied to their inputs. As noted above, phase distortions from line to line are not uncommon in most video recorders. Thus, the phase detector 27, the correction circuit 28, and the phase shifter 25 are provided to remove any such phase changes.

The two successive lines of the HF component, one from the high pass filter 22 and the other from the delay unit 24, are compared in the phase detector 27 which detects any phase relationship other than the normal 180° out of phase relationship of the two successive lines of video, and generates a signal related thereto. This signal is then applied, through a correction circuit 28, to the phase shifter 25, which shifts the phase of the delayed line to compensate for any phase differences. The correction circuit 28 is required to remove any output from the phase detector 27 which is due to the presence of the ART carrier. Even if there is no phase distortion between the two signals applied to the phase detector input, the phase detector will still generate an output signal since the ART carrier components of the two lines are in phase and thus represent a phase relationship other than the normal 180° out of phase relationship. Detailed descriptions of three suitable correction circuits are given below with reference to FIGS. 4, 5, 6, and 7.

The ART carrier appearing at the output of the adder 29 is of reference frequency but changes phase from line to line. To develop a signal of reference phase, the ART carrier is passed through a limiter 33, which provides a constant amplitude signal, and then to a network comprising a 180° phase shift network 34 and a switch 35. The switch 35 alternately switches, at the line frequency, from the direct signal supplied from the limiter 33 to the delayed signal supplied from the network 34. The reference carrier thereby developed is used to decode the composite chrominance signal from the subtractor 30 in a conventional decoder 36. Thus, the I and Q components are obtained.

The luminance signal, Y, is developed by subtracting the composite chrominance signal, at the subtractor 30, from the ART video signal, at the demodulator 21, in the subtractor 37. The delay unit 23 is provided to compensate for any delay of the composite chrominance signal. The output of the subtractor 37 contains, in addition to the luminance signal, the ART carrier. The latter is removed by the notch filter 38. Since the ART carrier is essentially a constant amplitude, constant frequency signal, the bandwidth of the filter 38 may be relatively narrow, for example about 100 kc. (kilocycles). The I, Q, and Y signals are converted to a conventional NTSC video signal in a conventional NTSC encoder 40.

While in the embodiment of FIG. 3, the NTSC signal is formed by decoding the ART signal and encoding the resulting components, it should be noted that other techniques may also be employed. For example the recovered ART carrier may be used merely as a phase reference signal to detect any phase errors in the signal read from the tape.

Figure 4:
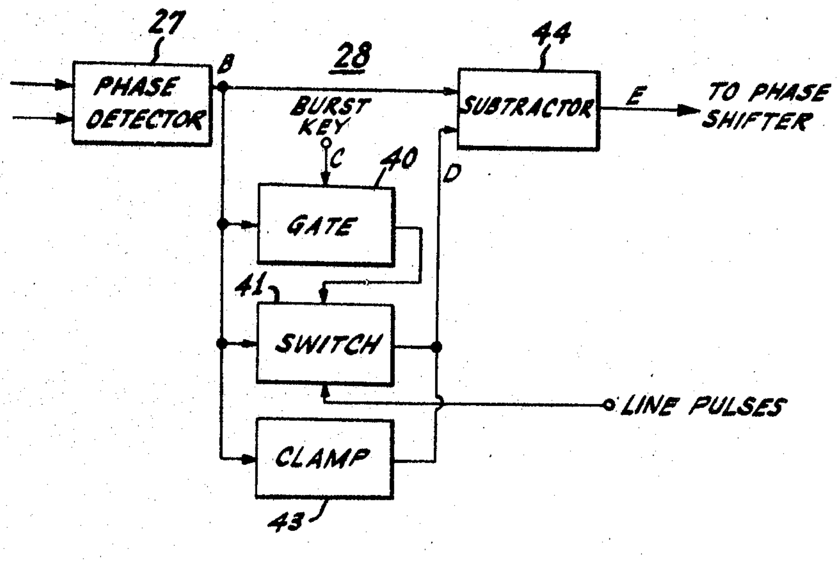
FIGURE 4 is a block diagram of one of the elements shown in the FIGURE 3 block diagram.

FIGURE 4 is a block diagram of one embodiment of the correction circuit 28 shown in FIG. 3. The output of the phase detector 27 is supplied to a first gate 40 which is open only during the color brurst interval. The output of the gate 40 controls the operation of a switch 41 which is turned on by a pulse from the gate 40 and turned off by a line sync pulse. The output of the phase detector 27 is supplied to the switch 41, to a clamp network 43, the output of which is combined with that of the switch 41, and to one input of the substractor 44. The substractor 44 is of conventional design and may for example comprise a resistive adding network and an inverter connected to one of the two input terminals. The second input to the substractor 44 is taken from the phase detector 27 output. The output of the subtractor 44 is supplied to the phase shifter 25 (FIG. 3).

Figure 5:
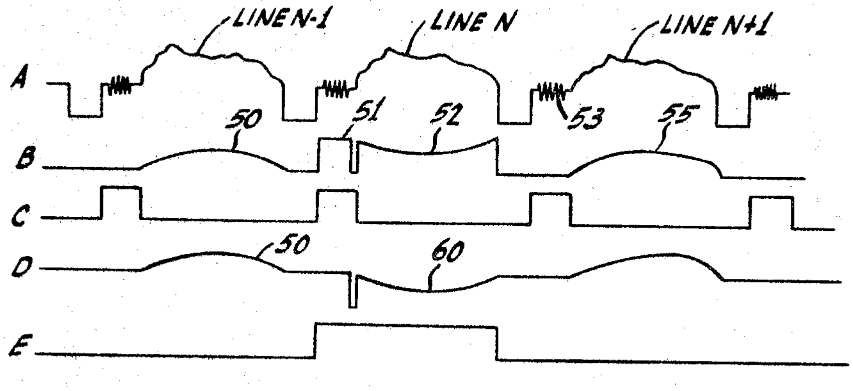
FIGURE 5 is a series of waveforms illustrating the operation of the system shown in FIGURE 4.

The operation of the system shown in FIG. 4 will be described with reference to the waveforms shown in FIG. 5. FIG. 5 shows at A three successive lines of video information. The waveform at B is the output of the phase detector 27. The waveform at C is the burst key signal supplied to the gate 40. The waveform at D is one of the inputs to the substractor 44. The waveform at E is the output of the substractor 44 which is supplied to the phase shift network 25 (FIG. 3).

As noted above, the correction circuit 28 is required to remove any spurious signal appearing at the output of the phase detector 27 due to the phase relationships of the ART carriers included in successive lines of video. The operation of the embodiment of FIGURE 4 will be described by assuming that a phase shift has occurred beween the lines $N-1$ and N shown at A in FIG. 5 while the line $N+1$ is of the same phase as the line N. When the HF portions of these three successive lines of video are applied to the phase detector 27, the waveform shown at B in FIG. 5 results. The first portion 50 of the waveform B is due to the presence of the ART carrier in the two lines of video applied to the phase detector 27. Since this does not represent any phase error but rather only the spurious effect of the ART carrier it should be removed before the signal is supplied to the phase shifting network 25 (FIG. 3). The second portion 51 of the waveform B is due to the phase error in the detected color bursts between the lines $N-1$ and N. The third portion 52 of the waveform B is due to the phase error in the video signals of lines $N-1$ and N. This portion 52, however, is not flat because of the presence of the spurious component resulting from the ART carrier. Since there is no phase error between lines N and $N+1$ no output appears at the phase detector 27 during the color burst 53 of the line $N+1$. Again however, the presence of the ART carrier does cause a fourth portion 55 of the waveform B to appear. Again this is an undesired output and should be removed before the signal is supplied to the phase shifter 25.

Referring again to FIGURE 4, if there is no phase error in successive lines of video being compared in the phase detector 27 then the output of the phase detector 27 is applied through the switch 41 which is turned on by the line sync pulse, to the substractor 44. Since the switch 41 is essentially a short circuit, the clamp 43 is inoperative. Since both inputs to the subtractor 44 are identical in this case, no signal appears at its output. This case is illustrated by the portion of the waveforms under the line $N-1$ in FIG. 5, corresponding to a comparision of lines $N-1$ and $N-2$ (not shown). The phase detector output during the $N-1$ interval is the portion 50 of the waveform B. This portion passes through the switch 41 and appears at D, one input to the subtractor. Thus, the output of the subtractor 44 is zero during this period. When a phase error occurs between successive lines of video, for example between lines N and $N-1$, the phase detector output will respond to the phase error in the color burst signal of the successive lines. The phase error in the color bursts results in the phase detector output shown at the portion 51 in waveform B. The gate 40 is opened by the burst key signal shown in waveform C and the output of the phase detector during this interval, i.e. portion 51, passes through the gate 40 and turns off the switch 41. Now, the output of the phase detector 27 must pass through the clamping network 43. The clamping network 43 clamps the input D to the subtractor 44 at the level of the detected pulse 51. The resulting signal supplied to the subtractor 44 is shown at 60 in waveform D. The switch 41 is again closed when the leading edge of a line pulse is applied to the other input of the switch 41. Closing the switch 41 discharges the clamp 43 and again allows the output of the phase detector 27 to appear at the D input to the subtractor 44. The resulting waveform is shown at E which is the output of the subtractor. It is seen that this waveform is a pulse which lasts for the entire active line of the video and the color burst intervals. The pulse shown at E is applied to the phase shifting network 25 (FIG. 3) and by the operation of one-line delay 24 the phase of line $N-1$ is shifted to be in phase with line N.

Figure 6:
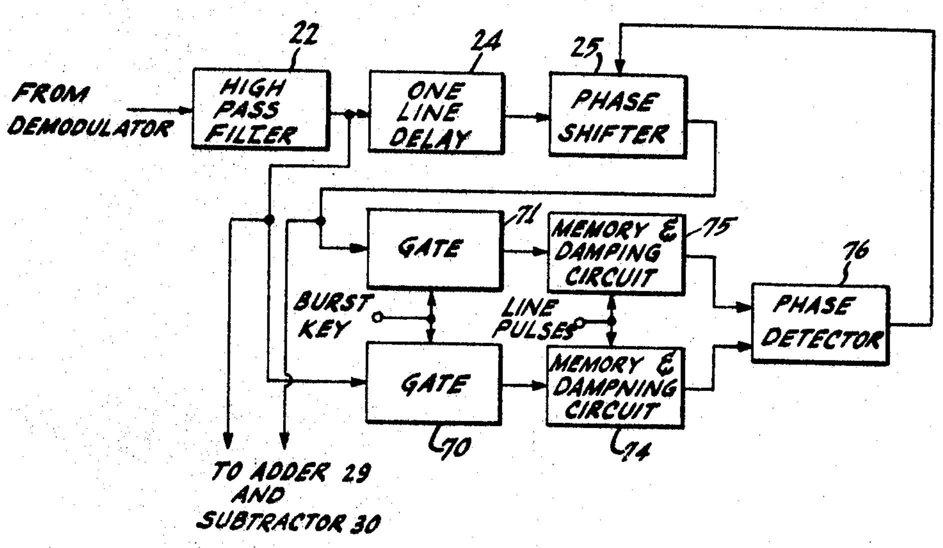
FIGURE 6 is a block diagram of a second embodiment of certain elements of the present invention.

FIGURE 6 is a block diagram of a second embodiment of a phase shifting and correction circuit which may be employed according to the present invention. The system of FIG. 6 is slightly different from the arrangement shown in FIG. 3, comprising the phase detector 27, the correction circuit 28, and the phase shifter 25. The high pass filter 22, the one line delay unit 24, and the phase shifter 25, shown in FIG. 6, correspond to the same elements shown in FIG. 3. In the arrangement of FIG. 6, the output of the high pass filter 22 is supplied to a first gate 70 which is opened during the color burst interval by the burst key signal. Similarly the delayed output from the phase shifter 25 is supplied to a second gate 71 which is also opened during the burst interval. The outputs from the two gates 70 and 71 are supplied to respective memory and damping circuits 74 and 75. The memory portion of the circuit 74 and 75 may comprise a conventional resonant circuit for maintaining the color burst, passed through the two gates 70 and 71, for the entire active line of the video. These may, for example, be ringing crystals. The damping circuits of the units 74 and 75 may comprise conventional switches which damp out the memory circuit upon the occurrence of a line pulse. The outputs of the two memory and damping circuits 74 and 75 are supplied to a phase detector 76 the output of which controls the phase shifter 25. In addition to being supplied to the two gates 70 and 71 the output of the high pass filter 22 and the output of the phase shifter 25 are supplied to the adder 29 and the subtractor 30 of FIG. 3.

Again, the purpose of the phase shifter 25 is to compensate for any appreciable phase errors from line to line so that the ART carrier and the chrominance signals can be accurately recovered in the adder 29 and the subtractor 30. In the circuit of FIG. 6 any such phase error is detected by comparing the color bursts on successive lines of video. Thus, the color bursts are gated out of the video signal by the two gates 70 and 71. These bursts are then stored in the memory circuits 74 and 75 for the entire active line of the video. Any phase difference between the two stored burst signals is detected in the phase detector 76 and the output of the phase detector 76 is used to compensate for the phase difference by controlling the phase shifter 25. Since the phase comparison for any two bursts should last only for one active line of video, the memory and damping circuits 74 and 75 are damped by line pulses supplied to each.

Figure 7:
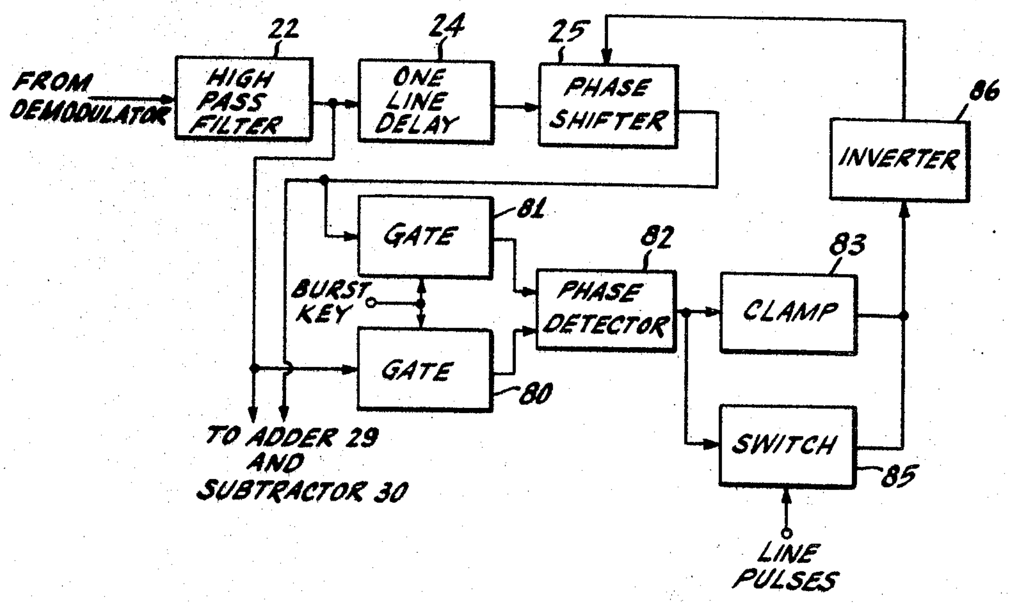
FIGURE 7 is a block diagram of a third embodiment of certain elements of the present invention.

FIGURE 7 is a block diagram of another embodiment of the phase shifting network which may be employed in the present invention. Like the system shown in FIG. 6, the FIG. 7 embodiment cannot be incorporated directly into the embodiment of FIG. 3; but only minor modifications are required. The minor modifications are indicated in the block diagram of FIG. 7. Again the high pass filter 22, the delay unit 24, and the phase shifter 25 correspond to the same elements as FIG. 3. In the embodiment of FIG. 7, the output of the high pass filter 22 and the output of the phase shifter 25 are supplied to respective gates 80 and 81. Each of these gates 80 and 81 is opened during the burst key interval. The outputs of the two gates 80 and 81 are compared in a phase detector 82 and the signal generated by the phase detector is applied to a clamp 83. The output of the clamp 83 is applied to the phase shifter 25 through an inverter 86. A switch 85 is provided to discharge the clamp circuit 83 upon the occurrence of line pulses.

In the operation of the FIGURE 7 embodiment, the burst signals from the direct and delayed lines of video are gated out by the gates 80 and 81 and compared in the phase detector 82. The output of the clamp circuit 83 is then clamped to the level of the phase detector 82 output. After the burst interval the phase detector output goes to zero and the output of the clamp 83 goes negative by an amount equal to the phase detector 82 output during the burst interval. The negative voltage is inverted in the inverter 86 and applied to the phase shifter 25. The switch 85 is provided to discharge the clamp circuit 83 upon the occurrence of a line pulse so that the next pair of bursts may be phase compared. The direct and delayed signals from the output of the high pass filter 22 and the output of phase shifter 25 are again supplied to the adder 29 and the subtractor 30 of FIGURE 3.

What is claimed is:

1. A system for recording and reproducing a video signal including a chrominance signal comprising, (a) means for combining a reference signal of predetermined frequency and said video signal to be recorded, the phase of said reference signal changing by about 180° from one line of said video signal to the next line of said video signal, relative to the chrominance signal, (b) means for recording the combined reference and video signal on a recording medium, (c) means for reading said combined signal from said medium, (d) adding means for adding successive lines of said combined signal read from said tape, whereby said reference signal results, (e) means for compensating for any phase errors in successive lines of said combined signal before said lines are added in said last mentioned means, and (f) means responsive to said reference signal resulting from said addition and responsive to the combined signal read from said tape for processing said combined signal.

2. A system as claimed in claim 1 wherein said video signal contains color bursts and said reference signal combined with said video signal in said first mentioned means is of the same frequency as said color burst and in a predetermined phase relationship with said color burst.

3. A system as claimed in claim 2 wherein said reference signal phase lags said color burst by 57° and 237° in alternate lines of said video.

4. A system as claimed in claim 1 wherein said fifth mentioned means comprises, (a) means responsive to said successive lines of said combined signal for comparing the phase of said successive lines and generating a phase shifting signal related to the phase difference, (b) means responsive to said phase shifting signal for removing from said phase shifting signal any portion of the signal due to the change in phase, from line to line, of said reference signal relative to the chrominance signal, and (c) means responsive to said last mentioned means for phase shifting every one of said successive lines of said combined signal, added to another line of said combined signal in said adding means, the amount of said phase shift being related to said phase shifting signal.

5. A system as claimed in claim 2 wherein said fifth mentioned means comprises, (a) means responsive to said successive lines of said combined signal for separating the color bursts therefrom, (b) means responsive to said color bursts for storing said color bursts during the remainder of the lines of said combined signal in which said bursts occur, (c) means responsive to said stored color bursts for developing a phase shifting signal related to the phase difference of said stored color bursts, and (d) means responsive to said phase shifting signal for phase shifting one of said successive lines of said combined signal added to another line of said combined signal in said adding means, the amount of said phase shift being related to said phase shifting signal.

6. A system as claimed in claim 2 wherein said fifth mentioned means comprises, (a) means responsive to said successive lines of said combined signal for separating the color bursts therefrom, (b) means responsive to said color bursts for comparing the phase of said color bursts and for generating a phase shifting signal related to the difference in phase of said color bursts, (c) means for storing said phase shifting signal during the active portion of one of said successive lines of said combined signal, and (d) means responsive to said phase shifting signal for phase shifting one of said successive lines of said combined signal, added to another line of said combined signal in said adding means, the amount of said phase shift being related to said phase shifting signal.

7. In a system for processing a combined video signal including a chrominance signal and which contains, in addition to video information, a reference signal which exists continually during the active portion of each line of video where the frequency of said reference signal is approximately constant and the phase varies by about 180° from line to line, relative to the chrominance signal the combination of, (a) means for adding every two successive lines of said combined signal to recover said reference signal, (b) means for subtracting every two successive lines of said combined signal to recover said chrominance signal, (c) means for compensating for any phase errors between said two successive lines of said combined signal prior to said adding and subtracting of said successive lines, and (d) means responsive to said combined video signal and to the outputs of said adding and subtracting means for reforming said combined video signal.

8. The combination as claimed in claim 7 wherein said third mentioned means comprises, (a) means responsive to said successive lines of said combined signal for comparing the phase of said successive lines and generating a phase shifting signal related to the phase difference, (b) means responsive to said phase shifting signal for removing from said phase shifting signal any portion of the signal due to the change in phase, from line to line, of said reference signal relative to the chrominance signal, and (c) means responsive to said last mentioned means for phase shifting every one of said successive lines of said combined signal, added and subtracted from another line of said combined signal, the amount of said phase shift being related to said phase shifting signal.

9. A system as claimed in claim 7 wherein each line of said combined signal contains, in addition to said video information and reference signal, a color burst signal, of predetermined frequency and phase, occurring during an interval other than the active portion of said video, and wherein said last mentioned means comprises, (a) means responsive to said successive lines of said combined signal for separating the color bursts therefrom, (b) means responsive to said color bursts for storing said color bursts during the remainder of the lines of said combined signal in which said bursts occur, (c) means responsive to said stored color bursts for developing a phase shifting signal related to the phase difference of said stored color bursts, and (d) means responsive to said phase shifting signal for phase shifting one of said successive lines of said combined signal added to another line of said combined signal in said adding means, the amount of said phase shift being related to said phase shifting signal.

10. A system as claimed in claim 7 wherein each line of said combined signal contains, in addition to said video information and reference signal, a color burst signal, of predetermined frequency and phase, occurring during an interval other than the active portion of said video, and wherein said last mentioned means comprises, (a) means responsive to said successive lines of said combined signal for separating the color bursts therefrom, (b) means responsive to said color bursts for comparing the phase of said color bursts and for generating a phase shifting signal related to the difference in phase of said color bursts.

(c) means for storing said phase shifting signal during the active portion of one of said successive lines of said combined signal, and (d) means responsive to said phase shifting signal for phase shifting one of said successive lines of said combined signal added to another line of said combined signal in said adding means, the amount of said phase shift being related to said phase shifting signal.

References Cited

UNITED STATES PATENTS 2,988,593 6/1961 Olive.

OTHER REFERENCES

Richard Theile: "The Work of the E.B.U. Ad-hoc Group on Colour Television," November 1963, Journal of the SMPTE, volume 72, pp. 860–862.

RICHARD MURRAY, Primary Examiner

U.S. Cl. X.R.

178—5, 6